(12) United States Patent
Soytürk et al.

(10) Patent No.: US 10,793,175 B2
(45) Date of Patent: Oct. 6, 2020

(54) CARE OR ORGANIZATION TROLLEY AND CLAMPING RAIL

(71) Applicant: Zarges GmbH, Weilhelm (DE)

(72) Inventors: Erkan Soytürk, Weilhelm (DE); Florian Krichenbauer, Weilhelm (DE)

(73) Assignee: Zarges GmbH, Weilhelm (DE)

( * ) Notice: Subject to any disclaimer, the term of this patent is extended or adjusted under 35 U.S.C. 154(b) by 0 days.

(21) Appl. No.: 16/355,115

(22) Filed: Mar. 15, 2019

(65) Prior Publication Data

US 2019/0344816 A1  Nov. 14, 2019

(51) Int. Cl.
  *B62B 3/04* (2006.01)
  *B62B 3/00* (2006.01)

(52) U.S. Cl.
  CPC ............... *B62B 3/04* (2013.01); *B62B 3/002* (2013.01)

(58) Field of Classification Search
  CPC .......... B62B 3/04; B62B 3/002; A61G 12/001
  See application file for complete search history.

(56) References Cited

U.S. PATENT DOCUMENTS

| | | | | |
|---|---|---|---|---|
| 3,897,855 A * | 8/1975 | Patterson | ............. | A61G 12/001 312/209 |
| 4,504,073 A * | 3/1985 | Isaacs | ............. | B62B 3/00 280/33.992 |
| 5,058,911 A * | 10/1991 | Hunter | ............. | B25H 1/12 212/196 |
| 5,152,542 A * | 10/1992 | DeVoe | ............. | B62B 3/02 280/47.371 |
| 5,509,672 A * | 4/1996 | Offerson | ............. | B25H 1/04 280/47.35 |
| 6,086,073 A * | 7/2000 | Tisbo | ............. | B25H 1/02 280/47.26 |
| 6,158,600 A * | 12/2000 | Ferrucci | ............. | A47B 55/02 108/147.11 |
| 8,453,771 B1 * | 6/2013 | Hirschfeld | ............. | B60L 8/003 180/65.1 |
| 8,727,297 B2 * | 5/2014 | Kelley, III | ............. | A47B 19/10 108/32 |
| 2007/0228680 A1 | 10/2007 | Reppert et al. | | |

FOREIGN PATENT DOCUMENTS

DE    102006012766 A1    9/2007

* cited by examiner

*Primary Examiner* — John D Walters
*Assistant Examiner* — James J Triggs
(74) *Attorney, Agent, or Firm* — Young & Thompson

(57) ABSTRACT

A medical or organisation cart includes a clamping rail for attaching accessories. The cart is rectangular when viewed from above, with rounded corners. The cart includes corner profiles among which at least one is provided with a vertically extending undercut extending to a top surface or a worktop of the cart. The clamping rail has a tensioner, a counter hold element and a connection strap connecting the tensioner with the counter hold element and which the accessories may be attached to or hanged on. The tensioner may be positively connected with the corner profile at the vertical undercut, and the clamping rail may be fixedly attached to the cart and may be detached, both with the help of the tensioner. The clamping rail may be fixedly attached at any position of the vertical undercut and at a position of an adjacent corner profile corresponding to that first position.

20 Claims, 5 Drawing Sheets

CARE OR ORGANIZATION TROLLEY AND CLAMPING RAIL

BACKGROUND OF THE INVENTION

Field of the Invention

The invention concerns a medical or organisation cart as well as a clamping rail.

Description of the Related Art

Medical or organisation carts are widely used in hospitals in order to transport, for example, medical products, and/or serve for the purpose of supporting internal processes in a ward for mobile stock-keeping for further objects such as, for instance, medical apparatuses and/or disinfectants.

It has already been suggested to store such objects or medical products not only inside a medical or organisation cart, but if, for example, these are needed more frequently, also at the sides of the medical or organisation cart, if required, so that these may be made available more easily and practically. As a result, the other objects positioned inside the cart may remain there free of vibrations, i.e. without being tipped over or knocked over by accident, for instance.

In order to attach these objects, which may also be regarded as accessories, at the sides of a medical or organisation cart, an additional component is required.

What has become known is medical or organisation carts with lateral carrying or grap handles for attaching accessories. The carrying handle is firmly mounted at the functional cart there with the help of two blind holes. The carrying handle protrudes beyond the lateral surface of the functional cart and extends at the side of the cart.

Although a number of objects may be attached or hanged there, if required and if the accessories are to be attached at the cart at various heights, this is not possible with such medical or organisation carts.

Other medical or organisation carts are known which are provided each with a rail system for attaching accessories. The rail system is usually provided with columns and straps which are arranged in a fashion perpendicular to each other. The columns are tightly connected with the cart by means of additional connection elements, and the straps with the accessories are vertically displaceable at the columns.

However, such a rail system is rather complex. The numerous components of the rail system at the cart which are required additionally put at risk the balance of the cart and may cause the cart to tilt over, in particular if the cart takes a quick turn.

SUMMARY OF THE INVENTION

Therefore, the invention is based on the task of creating a medical or organisation cart according to the Preamble of claim 1 and a clamping rail for attaching accessories at a medical or organisation cart according to the Preamble of claim 15, respectively, with the help of which accessories may be attached to the cart in a simple and secure fashion.

This task is solved by the disclosed embodiments.

Surprisingly the handling of medical or organisation carts is improved in accordance with the invention. In a hospital, it is important that medical or organisation carts may be strung together, if required, which is, in part to the right and in part to the left. A known medical or organisation cart is provided with lateral components, such as a carrying handle or a rail system for attaching accessories, and insofar it is hardly possible to carry out a good stringing-together.

In accordance with the invention, a clamping rail is provided, which accessories may be attached at or placed on. The clamping rail is attached directly to the cart, preferably at corner profiles of the cart. It is easily detachable from the cart, which eliminates the problem mentioned in a simple fashion.

It is advantageous that the clamping rail is fixedly attached to two corner profiles of the cart in accordance with the invention. As a result, no further component is needed at the cart for the attachment of the clamping rail. This surprisingly reduces the space needed for a medical or organisation cart with attached accessories and therefore leads to a further improved usability of the carts.

In accordance with the invention, the clamping rail may easily be fixedly attached to the medical or organisation cart and removed from said. For that purpose, the medical or organisation cart is provided with corner profiles among which at least one is provided with a vertically extending undercut. The clamping rail is provided with a tension element that may be positively connected with the corner profile at the undercut. The clamping rail is detached from the medical or organisation cart by means of detaching the tension element.

As a result of the positive connection, there is a rather large frictional force at the contact surface between the clamping rail and the medical or organisation cart. In accordance with the invention, accessories with the weight of, for example, up to 5 kg, in particular up to 10 kg, may safely be hanged to the medical or organisation cart, without there being the risk of the clamping rail sliding downwards. Operational safety profits from the comparatively high clamping force resulting from the tension element and the counter hold element. Said can, for instance, amount to 100 N.

If, for example, for storage of the medical or organisation carts, these are to be strung together, the clamping rails may first be easily detached in accordance with the invention. And may be placed inside the carts for re-use, if required. The undercuts which are provided at the corner profiles, in accordance with the invention, do not influence the stringing-up of the carts, but may even serve as a reference line for alignment of the carts, in accordance with the invention.

In accordance with the invention, the accessories may be displaced horizontally on the clamping rail in order to adapt them to different potential uses.

In accordance with the invention, the height of the clamping rail at the medical or organisation cart is adjustable and freely selectable. Thus, it is possible to attach accessories easily at different heights of the cart, if required. The undercut of the corner profile extends vertically, in particular up to the top surface or to a worktop of the cart. In order to be freer in selecting the height of the clamping rail, the undercut of the corner profile ideally extends over at least 50%, preferably at least 80%, in particular more than 90% of the vertical height of the cart. At any position of the undercut, the clamping rail may be clamped with the help of its tension element.

It is also advantageous if the undercut is provided to be symmetrical to its vertical central axis and in particular allows a selective hanging of the tension element of the clamping rail in such a fashion that the connection strap of the clamping rail—viewed from the undercut—faces either towards the one or towards the other horizontal side. The clamping rail may thus be mounted at the longitudinal side of the cart, or at its transverse side, which may be done in an unmodified fashion if both have the same length.

Also if the cart has a none-square, rectangular outline, the variability thus gained may thus be made use of, wherein then one clamping rail with a longer and one with a shorter connection strap are used.

These may be combined in any fashion and both use the same corner profile, the same undercut, a same tension element and a same counter hold element.

It is particularly advantageous that when the tension element is detached at least partly, the clamping rail is vertically displaceable into the vertical undercut. In this fashion, for example, medical staff may easily adjust the height of the clamping rail without having to entirely remove it from the cart.

It is particularly advantageous that the tension element is provided with a lever element, wherein a lever arm of the lever element is provided with a projection which engages with the vertical undercut and may be positively connected with the corner profile.

In accordance with the invention, the undercuts at the corner profiles at the medical or organisation cart are herein free of pre-defined lock-in positions. Thus the clamping rail may be fixedly attached inside the corner profile at any height and in an infinitely variable fashion. If, for instance, a tray is attached as the accessory part, said may be brought to an altitudinal position in such a fashion that it is aligned, for example, with an adjacent table.

In accordance with the invention, a plurality of clamping rails may be fixedly attached to the medical or organisation cart at the same time, one above the other, for attaching a plurality of objects. Each clamping rail is mounted at the cart at a different height for this purpose. For determining the vertical distances between the clamping rails, the dimensions of the accessories, in particular their heights, must be taken into account.

In a preferred embodiment, the tension element should be provided with a lever element, wherein a lever arm of the lever element is provided with a projection which engages with the vertical undercut and may be positively connected with the corner profile.

The attachment of the clamping rail at the medical or organisation cart is preferably carried out, in accordance with the invention, without the help of any tool. For the attachment, the counter hold element of the clamping rail, which former is in particular provided with an encompassing element, encompassing the corresponding position of the adjacent corner profile. Then the operator, for instance, swivels the lever arm of the tension element until the projection of the lever arm is in complete engagement with the undercut and is positively and fixedly attached there.

It is particularly advantageous to attach the clamping rails to the medical or organisation cart in this fashion. If a rail has already been attached to the cart, a further rail may be attached at a different height as desired. Thus, further accessories may be securely stored.

In an advantageous embodiment of the medical or organisation cart, a clamping rail should be attached to the medical or organisation cart and be provided to serve as the hanging base for accessories, as a grap handle and/or as a spacer.

In a further preferred embodiment, the lever element should be a two-armed knee lever which extends beyond the dead-centre position of the knee lever during the engagement of the projection with the undercut.

In order to overcome the dead-centre position of the knee lever, a relatively large force is necessary for activating the knee lever. This is particularly favourable for acting against an accidental collision with the clamping rail which might lead to the clamping rail falling off the cart, because in this embodiment the knee lever may only be detached from the undercut with the help of a distinctly larger force. Thus, an improved fixation of the clamping rail at the cart is possible.

In a further preferred embodiment, the tension element should be provided with an eccentric which also remains beyond its dead-centre position during engagement with the undercut. The eccentric fixation of the tension element at the clamping rail additionally promotes the protection against accidental detachment. Thus, this embodiment is just as favourable as the embodiment with a knee ever in other potential uses.

In a further preferred embodiment, the eccentric should be provided with a vertical flat portion at its side which faces towards the cart—which portion is also to be referred to as an equipotential surface—, thanks to which the detachment of the clamping rail may be carried out in two steps. First, the tension element must be partly detached from its original position, the attachment at the medical or organisation cart, and be brought into a central position. In this state, a vertical displacement of the clamping rail is possible.

It is advantageous to shape the tension element in such a fashion that, when the tension element is released, the tension element will snap back to its original position again. Thus, the fixation to the medical or organisation cart is guaranteed. From the central position of the tension element, it may additionally be further detached in order to remove the clamping rail from the medical or organisation cart.

In a further preferred embodiment, it should be possible to plug the projection as the tongue into the vertical undercut of the corner profile of the medical or organisation cart as the groove.

Since the tongue-and-groove connection has a better tight fit compared with a general projection-and-undercut connection, the fixation of the clamping rail at the cart is improved in accordance with the invention.

In a further preferred embodiment, the cross section of the groove should be essentially V-shaped and insofar form an angle which has a value of between 10° and 70°, in particular approximately 45°.

Together with the V-shaped groove with an angle of 45°, it is particularly advantageous that the corner profile comprising this groove is possible not only for a lateral attachment of the clamping rail. Said is rather also suitable for a front/rear attachment of the clamping rail. In particular, with an angle of 45°, the undercuts of the corner profiles may be used selectively for a front/rear, but also a lateral, attachment of clamping rails, each independently of each other. Merely the precisely equal altitudinal position of clamping rails adjacent across a corner is ruled out, but is not usually desired either.

In a further preferred embodiment, the tension element and the counter hold element should be cast parts. Cast parts are relatively true to shape and offer a stable connection with the cart, in accordance with the invention.

The connection strap is preferably a hollow profile, in particular made out of a light metal. Thus, a sufficiently solid strap is provided, and at the same time the weight of the clamping rail is as low as possible in order to optimize its load bearing capacity. The cross section of the connection strap is an upright standing hollow profile which is suitable for placing or attaching accessories.

In a further preferred embodiment, with the help of a longer connection strap, whose length should amount in particular to the 1.1-fold to 2-fold, or the 0.3-fold to 0.9-fold of the length of the connection strap for lateral attachment, it should be possible to attach the clamping rail to the front and/or rear of the medical or organisation cart.

Particularly preferred is the attachment of the clamping rail at the rear of the cart since at the front, at least one door or drawer is usually provided, with the help of which, for example, medical products inside the cart are accessible and which might therefore be opened frequently.

In a further preferred embodiment, it should be possible to attach two to four clamping rails at the same time at one of the lateral, front and rear sides, respectively, of the medical or organisation cart.

Thus it is possible to carry more accessories at the same time. By attaching clamping rails with accessories to both sides, the cart is balanced better too.

It is particularly preferred, in this embodiment, that identical cast parts are employed for the respective tension elements and identical cast parts are employed for the respective counter hold elements.

In a further preferred embodiment, the clamping rail should be provided as a handle which is particularly advantageous in cooperation with the cart with universal wheels. The medical staff may then easily push or pull the cart with the help of the handle. This is of particular advantage when a plurality of clamping rails are attached. Said may, for instance, be attached to three sides of the cart, ideally herewith not to the operating side of the cart, in order to guarantee easy access to the goods transported.

In a further preferred embodiment, the projection of the tension element should engage with an undercut of a rear corner profile of the medical or organisation cart, and the encompassing element of the counter hold element should encompass the adjacent front corner profile.

The tension element of the clamping rail extends at the engagement side of the cart and might collide with the front door of the cart. As a result of the arrangement of the tension element inside an undercut of a rear corner profile, this is prevented in accordance with the invention.

In a further preferred embodiment, a layer consisting of an anti-slip material should be provided at the contact surface of the projection of the tension element to the undercut of the corresponding corner profile and/or at the contact surface of the encompassing element of the counter hold element to the corresponding corner profile, the thickness of which layer amounts to between 0.1 mm and 5 mm, in particular 1 mm.

With the help of the anti-slip layer, the mounting of the clamping rail is improved as far as precision is concerned.

Moreover, the attachment of the clamping rail at the cart is guaranteed as a result. If there are variations in temperature during use of the cart, the cast parts and the corner profiles will expand to different extents due to their different coefficients of thermal expansion, which might lead to the risk of slipping.

If sample variances of the corner profile and/or the clamping rail may not be disregarded, the anti-slip layer will also strengthen the attachment of the clamping rail.

If the corner profiles have become wet during use of the cart, or accidental pollutions exist at the corner profiles, the anti-slip layer will allow a good adhesion of the clamping rail at the cart.

Thus, it is particularly favourable that a clamping rail employed may be used for multiple purposes thanks to the numerous different vertical attachment options. The rail may be used as a grap handle for controlling the cart, as a spacer between a number of medical or organisation carts, as a protection of the goods transported and the goods stored inside the cart, as a shock absorber or buffer in case of collisions and/or as a base for hanging accessories, such as, for instance, bottles of disinfectants.

BRIEF DESCRIPTION OF THE DRAWINGS

Further advantages, details and features result from the subsequent description of one exemplary embodiment of the invention with the help of the drawings, which show.

DESCRIPTION OF THE PREFERRED EMBODIMENTS

Figure 1:
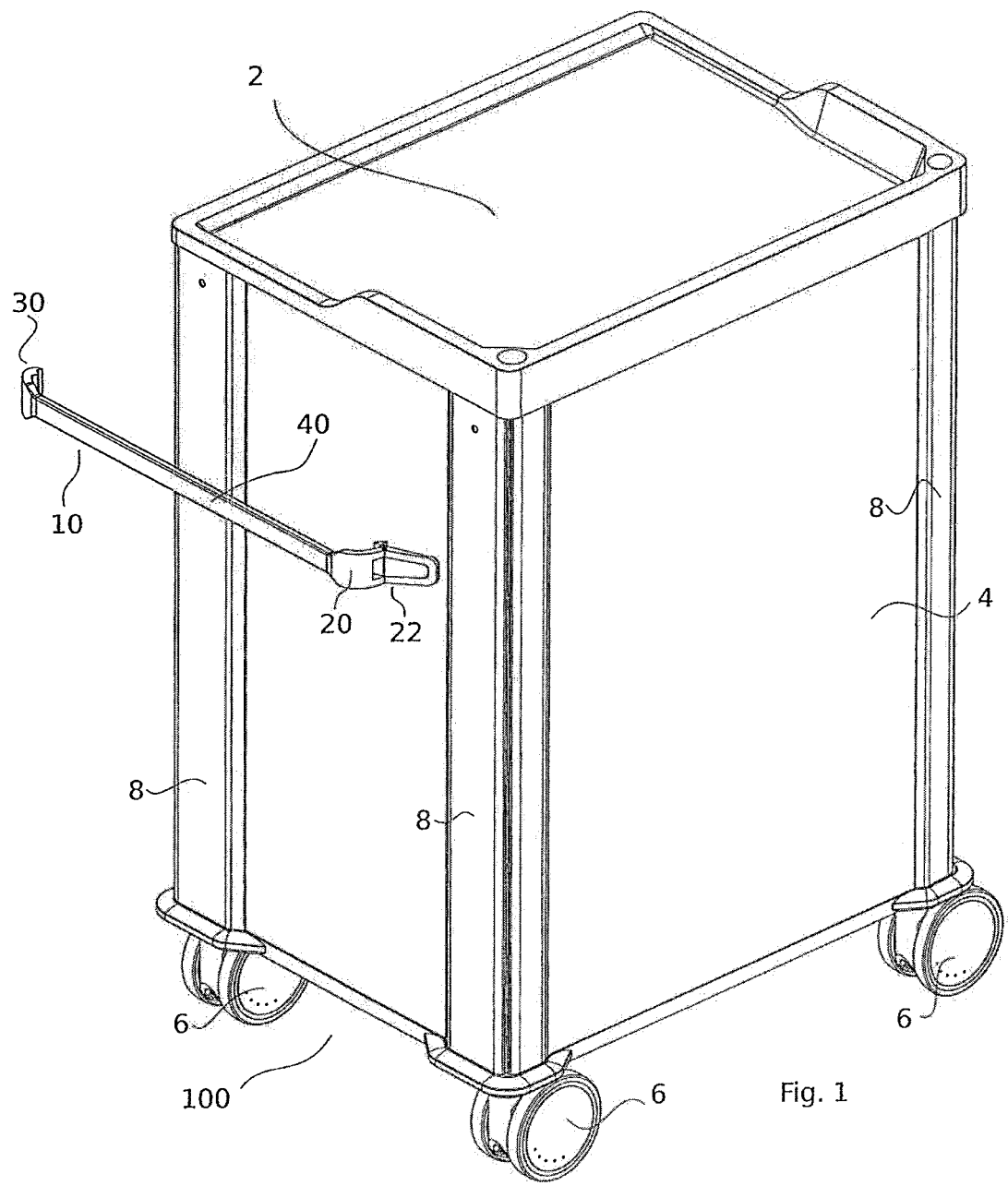
FIG. 1 a schematically depicted embodiment of the medical or organisation cart in accordance with the invention, with a detached clamping rail.

The medical or organisation cart 100 depicted in FIG. 1 comprises a cart body 4 in the shape of a straight prism, a worktop 2 on top of cart body 4, as well as four wheels 6. Cart body 4 is provided to be rectangular when viewed from above, with slightly rounded corners, and comprises four corner profiles 8 which extend at the vertical edges of cart body 4 and are produced with the help of extrusion-moulding processes.

Clamping rail 10 in accordance with the invention is in a detached state from medical or organisation cart 100 according to FIG. 1, and is provided with a tension element 20, a counter hold element 30 and a connection strap 40 which connects tension element 20 with counter hold element 30.

Tension element 20 and counter hold element 30 are cast parts which are relatively true to shape and, in accordance with the invention, offer a stable connection with cart 100. Connection strap 40 is a hollow profile made out of a light metal. Thus, a sufficiently solid strap is provided, and at the same time, the weight of clamping rail 10 is a low as possible in order to optimise its load bearing capacity.

Tension element 20 according to the embodiment depicted in FIG. 1 is provided with a lever element, which is, a knee lever 22.

Figure 2:
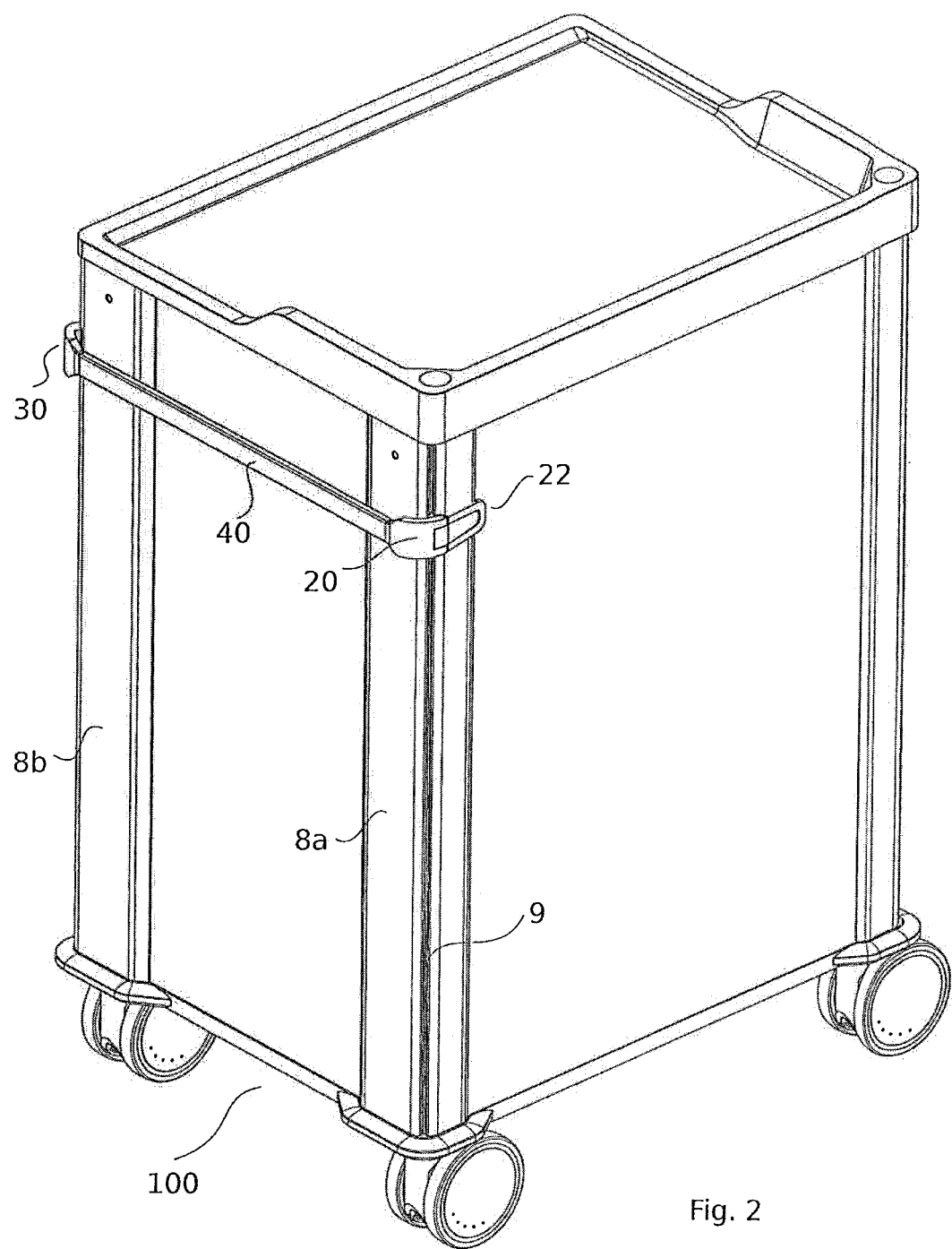
FIG. 2 the schematically depicted embodiment of the medical or organisation cart in accordance with the invention according to FIG. 1, with the clamping rail fixedly attached at its side.

According to FIG. 2, clamping rail 10 is fixedly attached to the side of medical or organisation cart 100. For this purpose, a corner profile 8*a* is provided with a vertically extending undercut 9 which extends up to worktop 2. Knee lever 22 is provided with a projection which engages with vertical undercut 9. In the meantime, counter hold element 30 encompasses a horizontally corresponding position of adjacent corner profile 8*b*. In this fashion, clamping rail 10 is positively connected with cart body 4.

A rather large frictional force at the contact surface between clamping rail 10 and cart body 4 results from the positive connection. In accordance with the invention, accessories with a weight of up to 10 kg may be securely attached to medical or organisation cart 100 without there being a risk of sliding.

After detachment of knee lever 22, clamping rail 10 is removed from cart 100, and if required, it may again be fixedly attached to cart 100 at a different height.

In accordance with the invention, it is particularly advantageous that when knee lever 22 is partly detached, clamping rail 10 is vertically displaceable inside vertical undercut 9. In this fashion, for instance, medical staff is able to easily adjust the height of clamping rail 10 without having to entirely remove it from cart 100.

If, for example, for storing a plurality of medical or organisation carts 100, said are to be strung up, it is possible, in accordance with the invention, to first easily remove clamping rails 10—as the state in FIG. 1 shows—, which clamping rails could then also be placed inside the carts for re-use. Undercuts 9 at corner profiles 8a in accordance with the invention do no influence the stringing-up of carts 100, but may serve as a reference line for the alignment of carts 100, in accordance with the invention.

Figure 3:
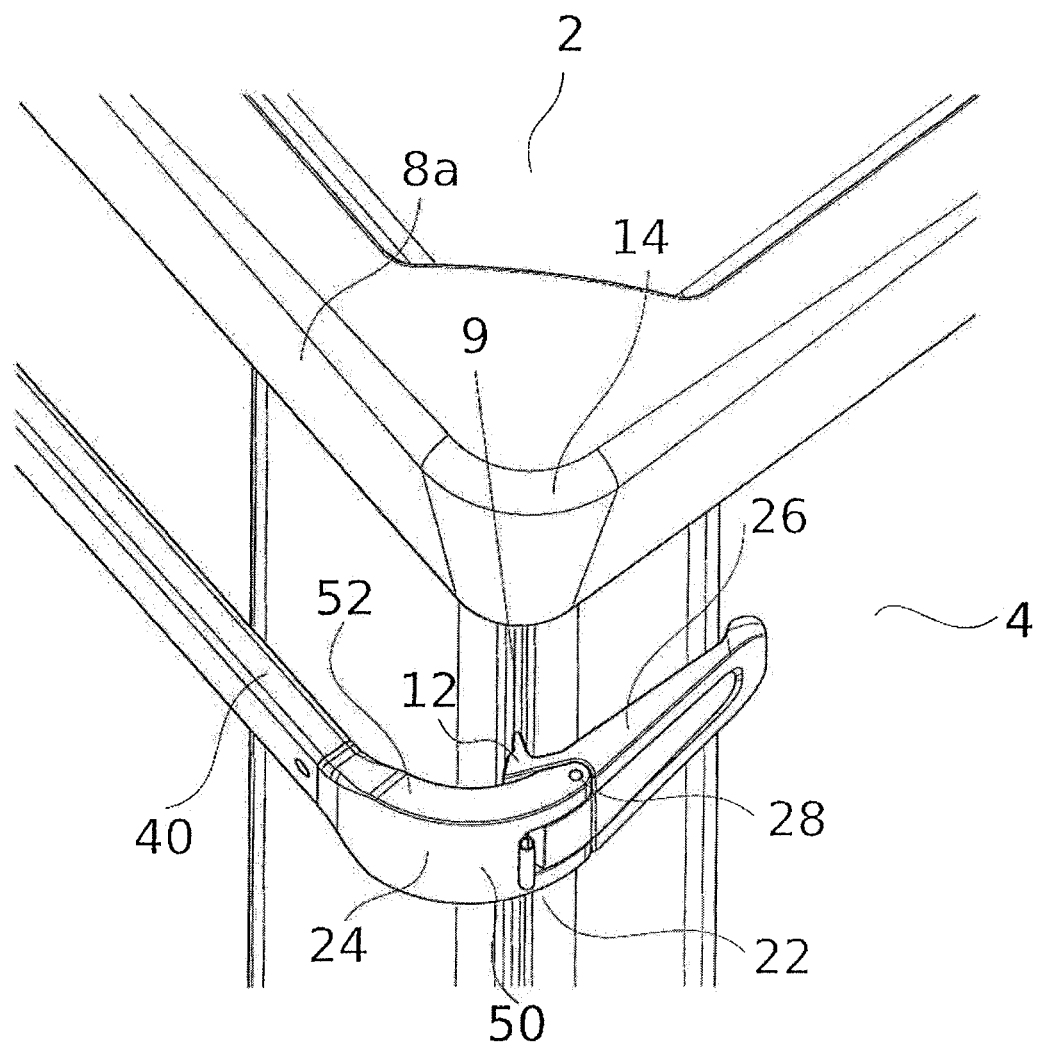
FIG. 3 an enlarged portion of the schematically depicted embodiment of the medical or organisation cart in accordance with the invention according to FIG. 2.

In FIG. 3, the positive connection is visible. Knee lever 22 has two arms and extends over its dead-centre position in the fixed state. For detachment of clamping rail 10, the dead-centre position of knee lever 22 must be overcome, which requires a relatively large force to be exerted onto knee lever 22.

This is, for instance, particularly favourable against accidental collision with clamping rail 10, which might lead to a separation of clamping rail 10 from cart 100, since knee lever 22 may only be detached from undercut 9 with the help of a considerably larger force. Thus, a better fixation of clamping rail 10 at cart 100 is possible.

Knee lever 22 is provided with a stationary part 24 and a swivel part 26 which is connected with stationary part 24 via a joint 28. Swivel part 26 comprises the two arms of knee lever 22, and the arm which is adjacent to stationary part 24 comprises projection 12 which engages with undercut 9. When knee lever 22 is clamped tightly, the base of the arm which is adjacent to the stationary part leans against stationary part 24, and an end surface of swivel part 26 leans against corner profile 8a.

Stationary part 24 is provided with an offset 50 which corresponds to an angle of approximately 90°. Stationary part 24 has essentially an equal thickness as connection strap 40. Stationary part 24 is vertically broader than connection strap 40 at its end which is more remote from connection strap 40, and has equal width as connection strap 40 at its end which is closer to the connection strap. Between the two ends of stationary part 24, a slanted surface 52 is provided.

In FIG. 3, a slightly rounded corner curve 14 is visible. Undercut 9 of corner profile 8a is provided in the region of the centre of rounded corner curve 14 when viewed from above. In accordance with the invention, this undercut 9 is also used for the rear fixation of a longer clamping rail to cart 100.

At projection 12, a small vertical groove is suggested at its side which faces rather towards stationary part 24. Said groove acts together with a correspondingly shaped counter surface of corner profile 8, and forms an equipotential surface for providing a central position. In said, knee lever 22 is only half detached, and clamping rail 8 may be vertically displaced.

Figure 4:
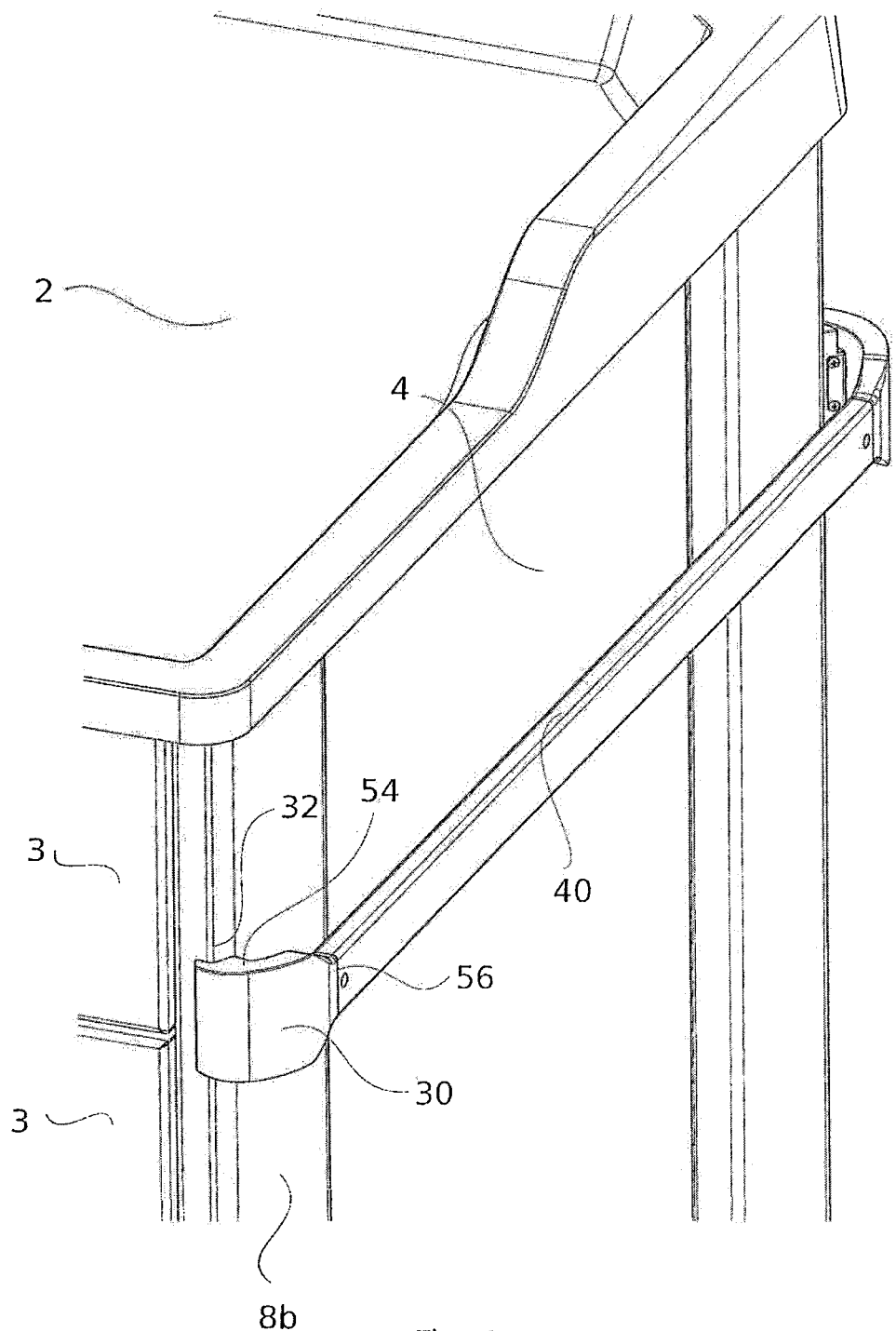
FIG. 4 a further enlarged portion of the schematically depicted embodiment of the medical or organisation cart in accordance with the invention according to FIG. 2.

In FIG. 4, counter hold element 30 is visible. Counter hold element 30 is provided with an encompassing element 32 with an offset, which encompasses the corresponding position of corner profile 8b which is adjacent to corner profile 8a that is provided with undercut 9.

According to the embodiment of cart 100 depicted, three drawers 3 are provided at corner profile 8b at the front side of the cart, with the help of which drawers medical products inside cart 100 are accessible, and which might therefore be opened frequently. As a result of the arrangement of counter hold element 30 being attached to front corner profile 8b and tension element 20, which—as is visible in FIG. 3—protrudes beyond corner profile 8a, being attached to rear corner profile 8a, the fixation of clamping rail 10 at cart 100 will influence the opening of none of drawers 3, in accordance with the invention.

Counter hold element 30 is—as is knee lever 22—provided with an offset 54 which corresponds to an angle of approximately 90°. Counter hold element 30 has essentially an equal thickness as connection strap 40 and is vertically broader than connection strap 40 at its end which is more remote from connection strap 40, and has an equal width as connection strap 40 at its end which is closer to connection strap 40. Between the two ends of counter hold element 30, a slanted surface 56 is provided.

With the help of a tension element that is vertically broader at its end side and a counter hold element that is vertically broader at its end side, it is prevented, in accordance with the invention, that the clamping rail gets accidentally jammed while being mounted at the cart. Insofar, the horizontally of the clamping rail at the cart is guaranteed.

In accordance with the invention, the fixation of clamping rail 10 at cart 100 and the detachment of said should be carried out without the help of any tool. The medical staff first makes counter hold element 30 encompass a suitable position of corner profile 8b. Then the operator swivels swivel part 26 of knee lever 22 until projection 12 of tension element 20 firmly engages with undercut 9 of corner profile 8a over the dead-centre position of knee lever 22. For the detachment of clamping rail 10, the operator swivels swivel part 26 in the opposite direction, with the help of a sufficiently large force in order to overcome the dead-centre position of knee lever 22.

Connection strap 40 is connected with tension element 20 and counter hold element 30 with the help of connection elements, such as steel pins; this is not visible in FIG. 3 nor in FIG. 4.

Figure 5:
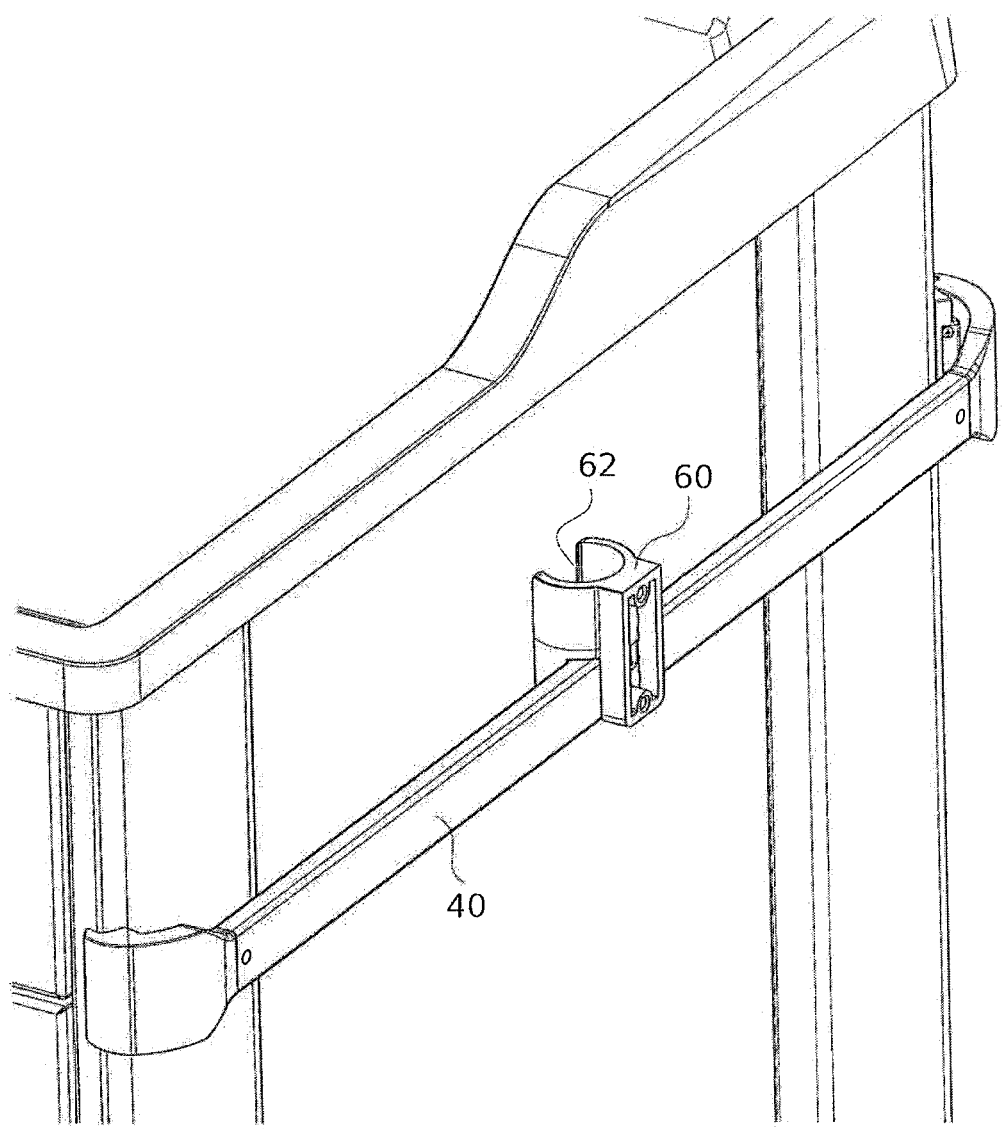
FIG. 5 a further enlarged portion of the schematically depicted embodiment of the medical or organisation cart in accordance with the invention according to FIG. 2 with an accessory holder.

According to FIG. 5, an accessory holder 60 clamps connection strap 40. Accessory holder 60 is provided with a recess 62 for the accommodation of accessories, such as a bottle of disinfectant, for example. Accessory holder 60 is horizontally displaceable on connection strap 40.

The cross section of connection strap 40 is an upright standing hollow profile which is suitable for placing accessories or accessory holders on it or attaching said at it.

In one embodiment which is not depicted, each at tension element 20 and at counter hold element 30, one groove which suggests the width of connection strap 40 should extend respectively, adjacently to connection strap 40.

The invention claimed is:

1. A medical or organisation cart (100) with a clamping rail (10) for attaching accessories at the medical or organisation cart (100) which is provided in particular to be rectangular with at least slightly rounded corners, essentially when viewed from above, wherein the medical or organisation cart (100) is provided with corner profiles (8, 8a, 8b) among which at least one is provided with a vertically extending undercut (9), the clamping rail (10) is provided with a tension element (20), a counter hold element (30) and a connection strap (40) which connects the tension element (20) with the counter hold element (30) and which the accessories may be attached to or hanged on, the tension element (20) may be positively connected with the corner profile (8a) at the vertical undercut (9), the clamping rail (10) may be fixedly attached to the medical or organisation cart (100) and may be detached from said, both with the help of the tension element (20), and the clamping rail (10) may be displaced vertically in an infinitely variable fashion and may be fixedly attached at any position of the vertical undercut (9) and at a position of an adjacent corner profile (8b) which horizontally corresponds to said first position.

2. The medical or organisation cart according to claim 1, wherein the tension element (20) is provided with a lever element, wherein a lever arm of the lever element is provided with a projection (12) which engages with the vertical undercut (9) and may be positively connected with the corner profile (8a).

3. The medical or organisation cart according to claim 2, wherein the projection (12) may be plugged, as the tongue, into the vertical undercut (9) of the corner profile (8a) of the medical or organisation cart, as the groove, and/or that the cross section of the groove is essentially V-shaped and forms an angle which has a value of between 10° and 70°, in particular approximately 45°.

4. The medical or organisation cart according to claim 1, wherein the counter hold element (30) is provided with an encompassing element (32), in particular an offset, which encompasses the horizontally corresponding position of the adjacent corner profile (8b).

5. The medical or organisation cart according to claim 1, wherein, when the tension element (20) is at least partly detached, the clamping rail (10) may be vertically displaced inside the vertical undercut (9).

6. The medical or organisation cart according to claim 1, wherein the lever element is a two-armed knee lever (22) which extends over the dead-centre position of the knee lever (22) when the projection (12) engages with the undercut (9), and/or that the tension element (20) is provided with an eccentric.

7. The medical or organisation cart according to claim 6, wherein the knee lever (22) is provided with a stationary part (24) and a swivel part (26) which is connected with the stationary part (24) via a joint (28), wherein the swivel part (26) comprises the two arms of the knee lever (22), and wherein the arm which is adjacent to the stationary part (24) comprises the projection (12), and/or that when the tension element (20) is clamped tightly, the base of the arm which is adjacent to the stationary part (24) leans against the stationary part (24) and/or an end surface of the swivel part (26) leans against the corner profile (8a) or to a wall adjacent to said.

8. The medical or organisation cart according to claim 1, wherein the tension element (20) and the counter hold element (30) are cast parts and the connection strap (40) is a hollow profile, in particular made out of a light metal, and/or that the corner profiles (8, 8a, 8b) are manufactured by means of extrusion-moulding processes, and/or that the cross section of the connection strap (40) is an upright standing hollow profile.

9. The medical or organisation cart according to claim 1, wherein, when viewed from above, the undercut (9) of the corner profile (8a) is provided in the region of the centre of the rounded corner curve (14) and extends vertically over at least a part of the height of the medical or organisation cart (100).

10. The medical or organisation cart according to claim 1, wherein the undercut (9) of the corner profile (8a) extends vertically over at least 50% of the height of the cart and/or that the undercut is provided symmetrically to its vertical central axis and in particular makes it possible to mount the tension element (20) of the clamping rail (10) in such a fashion that the connection strap (40) of the clamping rail (10)—viewed from the undercut (9)—faces either towards the one or towards the other horizontal side.

11. The medical or organisation cart according to claim 1, wherein the clamping rail (10) is provided with two offsets (50) in the longitudinal direction at the end sides at the tension element (20) and the counter hold element (30), which offsets each comprise an offset angle of between 30° and 120°.

12. The medical or organisation cart according to claim 1, wherein the clamping rail (10) may optionally be attached laterally at one of the two sides of the medical or organisation cart (100), and/or that, with the help of a longer connection strap (40), whose length amounts in particular to the 1.1-fold to 2-fold, or the 0.3-fold to 0.9-fold of the length of the connection strap (40) for the lateral attachment, the clamping rail (10) may be attached to the front and/or rear of the medical or organisation cart (100), and/or that two to four clamping rails (10) may be attached respectively to one of the lateral, front and rear sides of the medical or organisation cart (100) at the same time.

13. The medical or organisation cart according to claim 1, wherein the projection (12) of the tension element (20) engages with an undercut (9) of a rear corner profile (8a) of the medical or organisation cart and the encompassing element (32) of the counter hold element (30) encompasses the adjacent front corner profile (8b).

14. The medical or organisation cart according to claim 1, wherein the tension element (20) and the counter hold element (30) have essentially an equal thickness as the connection strap (40), and that the tension element (20) and the counter hold element (30) are vertically broader than the connection strap (40) at the end which is more remote from the connection strap (40) and have an equal width as the connection strap (40) at the end which is closer to the connection strap (40), in particular for guaranteeing the horizontality of the clamping rail (10), wherein between the two ends of the tension element and the counter hold element (20) a slanted surface (56) is provided respectively.

15. A clamping rail (10) for attaching accessories at a medical or organisation cart (100), with a tension element (20), a counter hold element (30) and a connection strap (40) which connects the tension element (20) with the counter hold element (30) and which the accessories may be attached to or hanged on, wherein the tension element (20) may be positively connected with the corner profile (8a) at a vertically extending undercut (9) of a corner profile (8a) of the medical or organisation cart (100), and wherein the clamping rail (10) may be fixedly attached to and detached from the medical or organisation cart (100) with the help of the tension element (20).

16. The medical or organisation cart according to claim 2, wherein the counter hold element (30) is provided with an encompassing element (32), in particular an offset, which encompasses the horizontally corresponding position of the adjacent corner profile (8b).

17. The medical or organisation cart according to claim 3, wherein the counter hold element (30) is provided with an encompassing element (32), in particular an offset, which encompasses the horizontally corresponding position of the adjacent corner profile (8b).

18. The medical or organisation cart according to claim 2, wherein, when the tension element (20) is at least partly detached, the clamping rail (10) may be vertically displaced inside the vertical undercut (9).

19. The medical or organisation cart according to claim 1, wherein the undercut (9) of the corner profile (8*a*) extends vertically over at least 80% of the height of the cart and/or that the undercut is provided symmetrically to its vertical central axis and in particular makes it possible to mount the tension element (20) of the clamping rail (10) in such a fashion that the connection strap (40) of the clamping rail (10)—viewed from the undercut (9)—faces either towards the one or towards the other horizontal side.

20. The medical or organisation cart according to claim 1, wherein the undercut (9) of the corner profile (8*a*) extends vertically over at least 90% of the height of the cart and/or that the undercut is provided symmetrically to its vertical central axis and in particular makes it possible to mount the tension element (20) of the clamping rail (10) in such a fashion that the connection strap (40) of the clamping rail (10)—viewed from the undercut (9)—faces either towards the one or towards the other horizontal side.

\* \* \* \* \*